(No Model.)　　　　　　　　　　　　　　　　　　　　6 Sheets—Sheet 1.
J. R. WILLIAMS.
CIGAR BUNCHING MACHINE.

No. 369,419.　　　　　　　　　　　　　Patented Sept. 6, 1887.

Fig. 1.

WITNESSES:　　　　　　　　　　　　　　　　　　　INVENTOR
Edward Wolff　　　　　　　　　　　　　　　　　John R. Williams,
J. R. Ellison　　　　　　　　　　　　　　　　　　BY
　　　　　　　　　　　　　　　　　　　　　　Ellison & Gill,
　　　　　　　　　　　　　　　　　　　　　　　ATTORNEYS.

(No Model.) 6 Sheets—Sheet 2.

J. R. WILLIAMS.
CIGAR BUNCHING MACHINE.

No. 369,419. Patented Sept. 6, 1887.

Fig. 2.

WITNESSES:
Edward Wolff
S. R. Ellison

INVENTOR
John R. Williams,
BY
Ellison & Gill,
ATTORNEYS.

(No Model.) 6 Sheets—Sheet 3.
J. R. WILLIAMS.
CIGAR BUNCHING MACHINE.

No. 369,419. Patented Sept. 6, 1887.

Fig. 3.

WITNESSES:
Edward Wolff
S. R. Ellison

INVENTOR
John R. Williams,
BY
Ellison & Gill,
ATTORNEYS.

(No Model.) 6 Sheets—Sheet 4.

J. R. WILLIAMS.
CIGAR BUNCHING MACHINE.

No. 369,419. Patented Sept. 6, 1887.

WITNESSES:
Edward Wolff
S. R. Ellison

INVENTOR
John R. Williams,
BY
Ellison & Gill,
ATTORNEYS

(No Model.)  J. R. WILLIAMS.  6 Sheets—Sheet 6.
CIGAR BUNCHING MACHINE.

No. 369,419.  Patented Sept. 6, 1887.

WITNESSES:

INVENTOR
John R. Williams,
BY
Ellison & Gill,
ATTORNEYS.

UNITED STATES PATENT OFFICE.

JOHN R. WILLIAMS, OF NEWARK, NEW JERSEY.

CIGAR-BUNCHING MACHINE.

SPECIFICATION forming part of Letters Patent No. 369,419, dated September 6, 1887.

Application filed May 5, 1887. Serial No. 237,182. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Bunching Machines, of which the following is a specification.

The invention relates to improvements in machines for making cigars, and particularly to machines for forming the "bunch" in the outline of a cigar preparatory to receiving the ultimate wrapper.

The particular nature of the invention and of the construction of the machine by which it is carried into effect will be understood from the detailed description hereinafter presented, reference being had to the accompanying drawings, in which—

In the drawings, A designates the bed-plate of the machine, which bed-plate will be of suitable size to permit the convenient operation of the rolling mechanism, and is supported upon legs of ordinary construction. (Not shown.)

Figure 3:
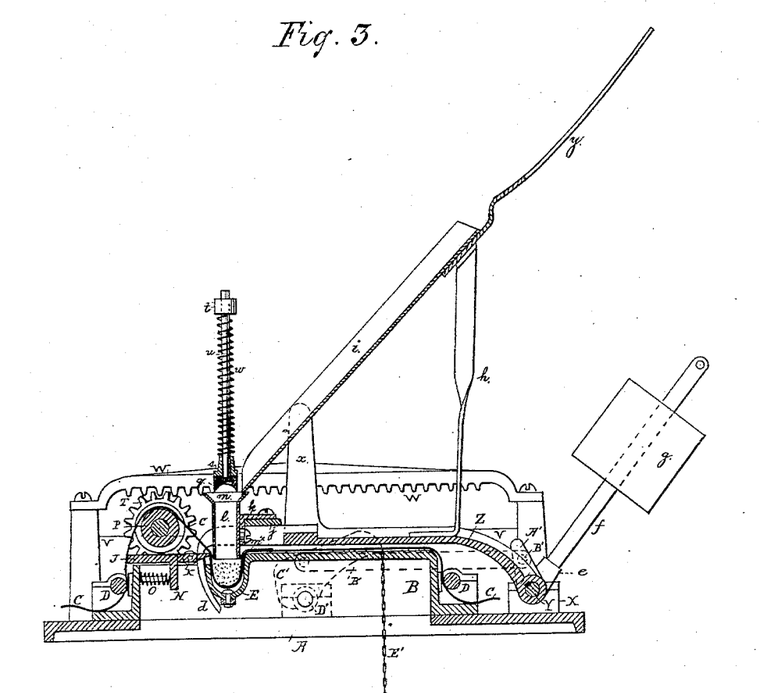
Fig. 3 is a central vertical longitudinal section through the rolling mechanism.
Figure 4:
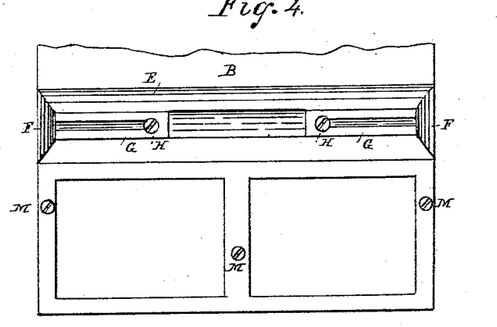
Fig. 4 is a top view of the front end of the rolling-table, the apron and sliding plate, hereinafter referred to, being omitted.

Upon the bed-plate A, which will preferably be of cast metal, is the raised portion B, forming an elevated rolling-table, upon which is arranged the apron C, the ends of the latter being secured between the ends of said table and the rods D, as shown in Fig. 3. In the front portion of the table B is formed the mold E, of suitable size to receive the tobacco for a single bunch. This mold E extends entirely across the table B, and is provided at its ends with the laterally-adjustable plates F, which close the ends of the mold, and are provided at their lower edges with the inwardly-extending slotted plates G, which fit in a groove in the base of the mold and are retained by means of screws H, passing downward through their slots. The ends and plates G are integral with each other, and are adapted, by reason of the screws H and the slots I, to be moved toward each other when it is desired to vary the size of the bunch. The position of the ends of plates F in the mold E will be governed by the length of the bunch sought to be produced, and their use enables me in one machine, without material loss of time, to form bunches of a length suitable for the character of cigar to be manufactured.

Figure 5:
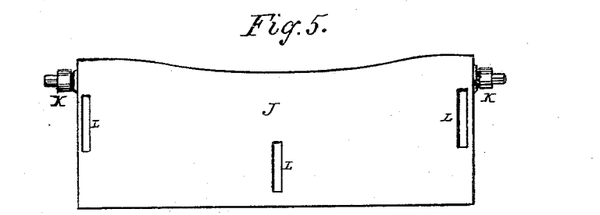
Fig. 5 is a top view of the said sliding plate, which rests upon the front end of the rolling-table beneath the apron.

Between the mold E and the front end of the table is placed upon the latter the plate J, (see Figs. 3 and 5,) which carries upon its opposite side edges the rollers K and is slotted, as at L, to receive the screws M, which act as guides for the plate J during its movement toward and from the mold E while the machine is in use. Upon the under side of the plate J is provided the depending flange N, (see Fig. 3,) against which spiral springs O act, creating a tension on said plate toward the mold E. The springs O (any desired number being employed) are of usual form, and are supported upon pins, as shown. The edge of the plate J adjacent to the mold E is fashioned to conform to the outline of a cigar. (See Fig. 5.)

The apron C is loose upon the upper surface of the table B and passes over the mold E and the roller P, (see Figs. 2 and 3,) whose surface conforms to the outline of a cigar, and is placed between hubs Q upon the rod R, which extends from one side of the bed-plate A to the other, and is provided with the hand-roller S, by which it may be operated. The ends of the rod R rest upon the vertical sides V of the bed-plate A and are provided with pinion-wheels T, engaging the toothed racks W, which, together with the said pinion-wheels, insure a uniform motion in the opposite ends of the rod R during the process of rolling the bunch.

The rod R, with the roller P, hand-roller S, and pinion-wheels T are not claimed herein, since they are the same in construction and effect as the like elements shown in Letters Patent of the United States No. 353,907, issued to me on the 7th day of December, 1886.

Figure 1:
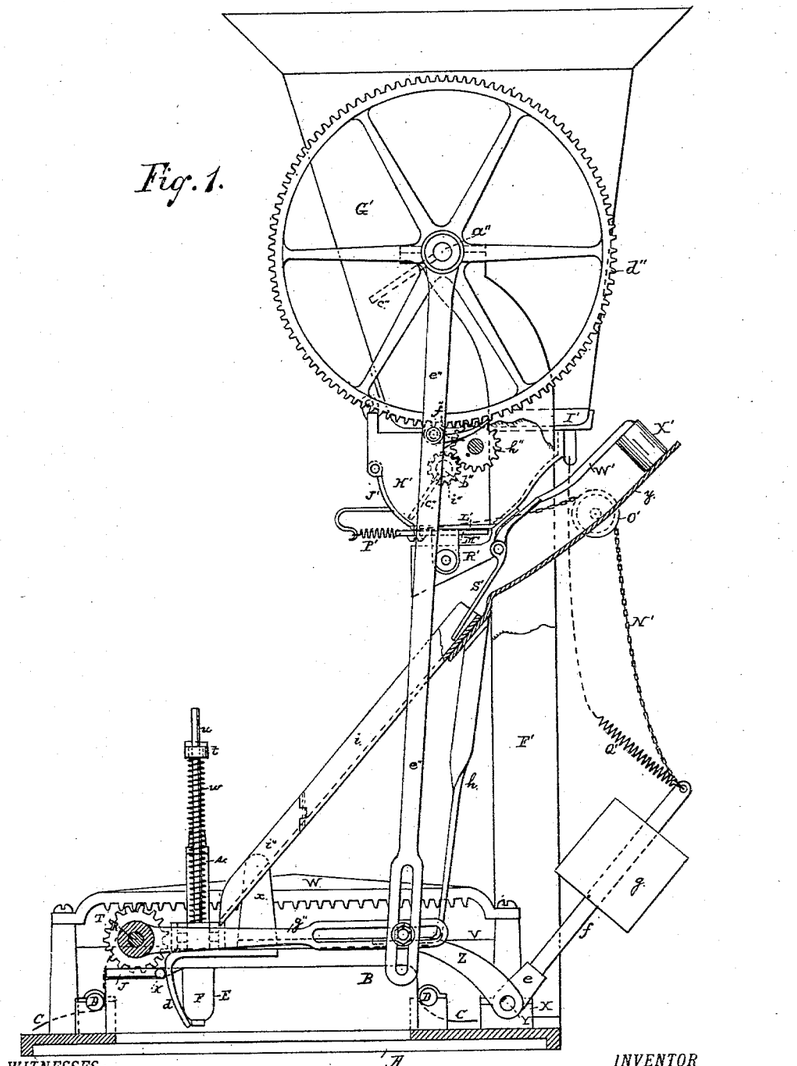
Figure 1 is a side elevation of the machine, the legs of the table supporting it being omitted and a part of the mechanism being in section.
Figure 2:
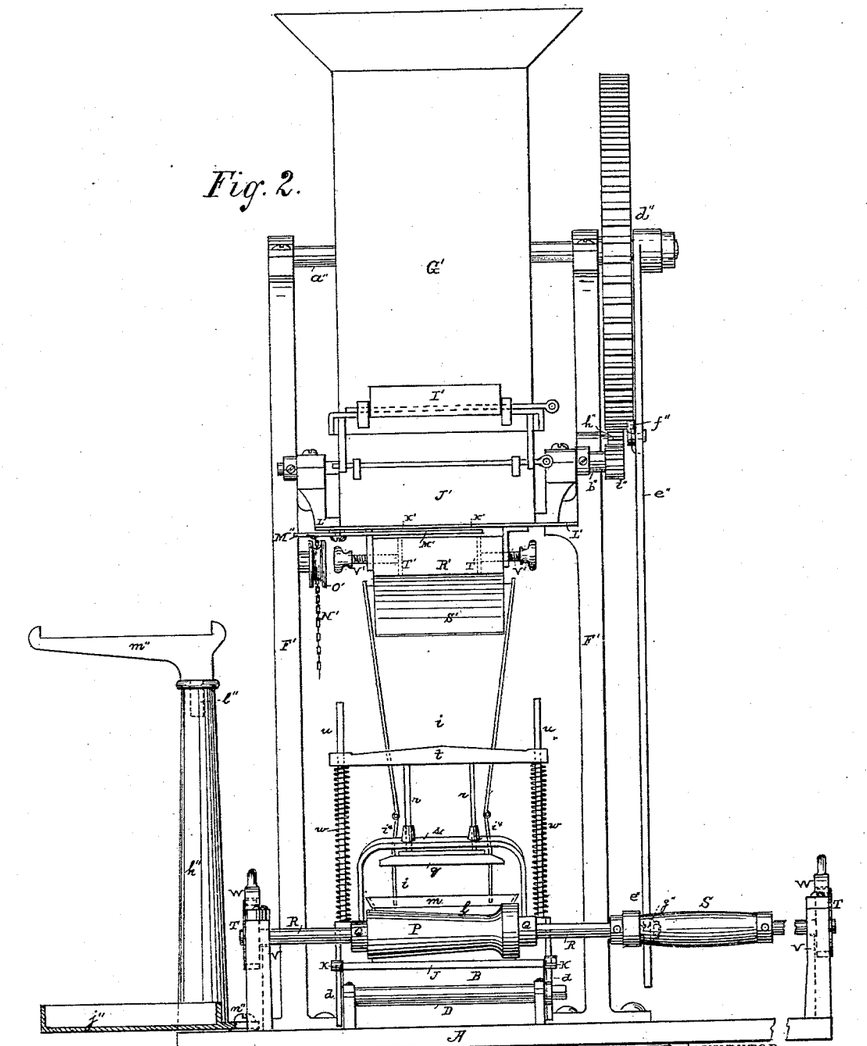
Fig. 2 is a front elevation of same.
Figure 7:
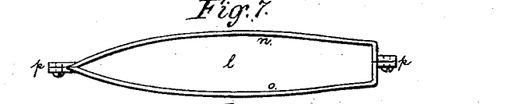
Fig. 7 is a bottom view of the funnel.
Figure 8:
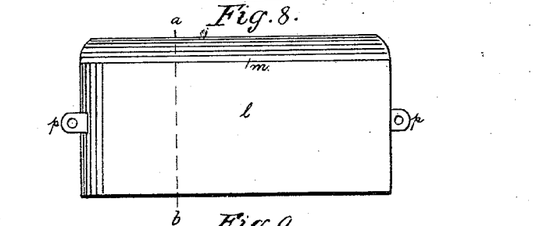
Fig. 8 is a front elevation of said funnel.
Figure 9:
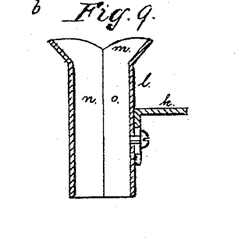
Fig. 9 is a vertical section of same on the dotted line *a b* of Fig. 8.

Upon the rear end of the table is journaled in lugs X the rod Y, upon which is keyed the casting Z, which constitutes a hinged section extending over the table B toward the front end of the machine and terminating at its front portion with the cam-bars $d$, which extend downward, one on each side of the table B, in front of the mold E, as indicated in Figs. 1, 2, and 3. The casting or hinged section Z has at its rear end, integral therewith, the lug $e$, (shown in Figs. 1 and 2,) into which is screwed the rod $f$, extending at an angle upwardly and rearwardly from a vertical central line through the rod Y and carrying the counterbalance-weight $g$. Upon the upper side of the hinged section Z is secured the standard $h$, of ordinary form, which supports upon its upper end the inclined chute $i$, hereinafter referred to. Upon the front edge of the hinged section Z (at which point there is a transverse bar, $j$) is secured, by means of an angle-plate, $k$, and screws, the funnel $l$, which is open at its top and bottom and is in the outline of a cigar, the upper edge of the funnel having an outwardly-flaring edge or rim, $m$, immediately below the lower end of the chute $i$, as indicated in Figs. 1 and 3. The funnel $l$ is composed of two suitably-fashioned plates, $n$ $o$, placed together and there secured by screws passing through lugs $p$, cast with them, as shown more clearly in Figs. 7 and 8.

Figure 6:
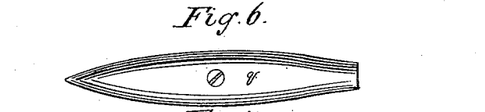
Fig. 6 is a face view of the under side of the plunger for pressing the filler-tobacco into the funnel.
Figures 10, 11:
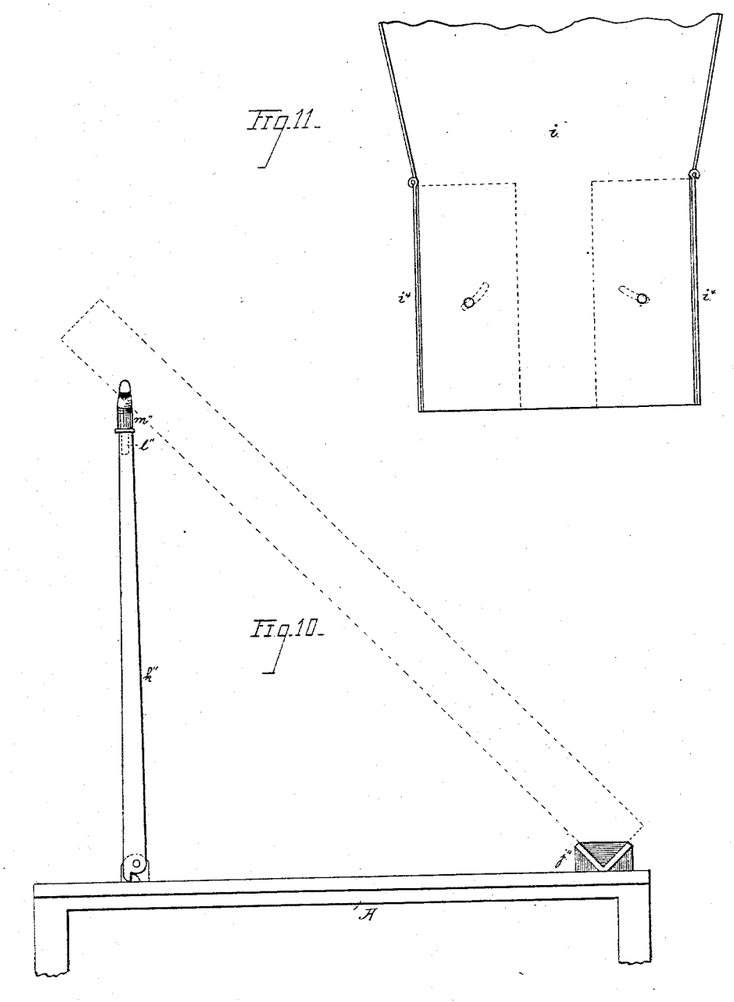
Fig. 10 is a side elevation of the table, illustrating merely the devices for supporting the usual wooden mold into which the bunches are placed as they are taken from the rolling-apron during the use of the machine.
Fig. 11 is a detached front elevation of the lower end of the chute which conveys the filler-tobacco from the hopper to the matrix, the said view being presented to illustrate the wings shown partially by dotted lines at the opposite edges of the lower end of said chute, whereby the latter may be widened to suit the varying sizes of matrices, as hereinafter pointed out.

The funnel $l$ is employed in connection with the plunger $q$, (a bottom view of which may be seen in Fig. 6,) which is secured upon the lower ends of the rods $r$ $r$, (see Fig. 2,) which pass upward through apertures in the bridge $s$ and carry upon their upper ends the cross-bar $t$, the ends of which contain apertures and are adapted to have a vertical movement upon the rods $u$, secured at their ends at opposite sides of the table B, suitable coiled springs, $w$, being placed upon said rods $u$ $u$, between the table B and the cross-bar, to give said bar and the plunger $q$ a tension upward to the position illustrated in Fig. 2. The lower ends of the bridge $s$, which is a simple strip of metal, are secured to the hinged section Z. The lower surface of the plunger $q$ is concave, to conform as nearly as may be to the outline of a cigar. Upon the hinged section Z is also provided at opposite sides the standards $x$, which extend upward upon opposite sides of the chute $i$ and serve to sustain it against lateral vibration, the standards being cast with the hinged section. To the upper end of the chute $i$ is secured the plate $y$, which is given a curved upper surface and operates as a cam, as hereinafter described, and at the lower end of the chute are provided the hinged side wings, $i^t$ $i^t$, (see Figs. 1, 2, and 11,) the sides of which form the sides of that portion of the chute, while their lower portions (shown by dotted lines in Fig. 11) extend beneath the floor of the chute and are slotted to receive guide-pins, as shown. The wings $i^t$ $i^t$ may be moved outward to widen the lower end of the chute to fit the size of the funnel $l$, which will vary according to the character of the cigar to be produced.

Upon the left-hand end of the rod Y is rigidly affixed the crank-arm A', which extends upward and has pivoted to it the rear end of the draw-rod B', (shown by dotted lines in Fig. 3,) the front end of the said rod being pivoted to the rocking plate C', also indicated by dotted lines, and which is secured upon the rod D', mounted in suitable bearings. Upon the upper surface of the rocking plate C' is secured one end of the chain E', which passes downward over the rear end of said plate and is connected at its lower end with an ordinary foot-treadle, (not shown,) this treadle, the rocking plate C', draw-rod B', and crank-arm A' being the same as the like devices illustrated in my Letters Patent aforesaid, bearing date December 7, 1886. In the operation of these last-named elements, the foot of the attendant is pressed upon the treadle, thereby causing the plate C' to turn rearward on its rod D' and forcing the rod B' and crank-arm A' rearward, the movement of the crank operating to rotate the shaft Y and to cause the hinged casting or section Z to turn upward. During this movement the weight $g$ operates to counterbalance the weight of the section Z and the elements which it carries, and thus facilitates the free movement of the section. Upon the foot being released from the treadle, the weight of the front part of the section Z, which is slightly in excess of that of the counter-balance $g$, causes the return of said section to its former position, the movement of the rod Z, crank A', rod B', and plate C' being thereby reversed.

Upon the rear edge of the bed-plate A, and at opposite sides of the table B, are secured the standards F', which support the hopper G', in which the filler-tobacco is placed. The upper portion of the hopper G' will preferably be made of sheet metal, while its lower portion, H', is of cast metal, and secured to the upper portion by suitable lips, I', of ordinary construction. In the front of the cast-metal portion of the hopper is provided the hinged door J', which may be opened should it be necessary at any time to inspect the contents of the hopper G' at its lower end. The lower end of the hopper has an aperture, (denoted in Fig. 2 by dotted lines K',) and rests upon the plate L', which closes the lower end of the hopper, with the exception of said aperture. Upon the lower side, and at one end of the plate L', is pivoted the valve-plate M', as shown in Fig. 2, this plate being adapted to be moved back and forth on its pivot below the aperture K', for the purpose of either opening or closing the same. To the rear edge of the outer end of the plate M' is attached the chain N', (shown more clearly in Fig. 1,) which passes over the roller O', and connects at its lower end with the upper end of the rod $f$. Upon the front edge of the outer end of the valve-plate M' is provided the spring P', which operates as a tension to close the plate over the aperture K' when it is not desired that the tobacco shall fall through the same.

When the hinged section Z is turned upward by means of the foot-treadle hereinbefore referred to, the movement of the rod $f$ operates through the chain N' to move the plate M' from the aperture K', permitting thereby the escape of the tobacco; but when the hinged section Z is returned to its position over the table B the force exerted by the rod $f$ is released, and the spring P' again closes the plate M' over the aperture K'. In order to facilitate the return of the hinged section Z to its position over the table B, although not usually required, I have provided a tension-spring, Q', which operates to overcome the effect of the counter-balance $g$ and start the hinged section Z toward its position upon the table.

Figure 12:
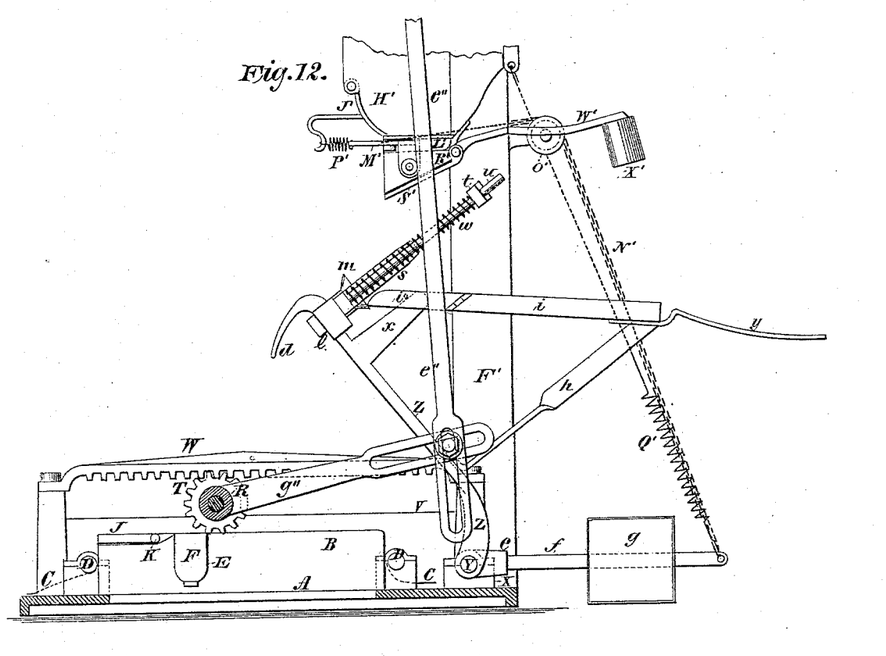
Fig. 12 is a side elevation of the machine, the hopper being broken away and the hinged section, with its connecting parts, being shown in an elevated position.
Figure 13:
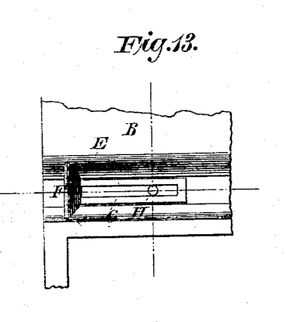
Fig. 13 is a detached top view of one end of the mold in the rolling-table.
Figure 14:
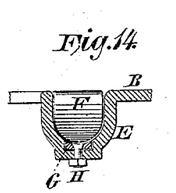
Fig. 14 is a section of same on the vertical dotted line of Fig. 13.
Figure 15:
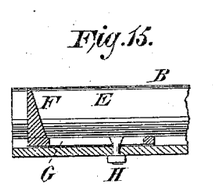
Fig. 15 is a longitudinal section of same on the horizontal dotted line of Fig. 13.

Below the plate L', and in line with the aperture K', is firmly secured the box R', as shown in Figs. 1, 2, and 12, said box having a hinged bottom, S', adapted to open downward, and also vertical partitions T', (indicated by dotted lines in Fig. 2,) the partitions being secured upon the inner ends of the adjusting-screws V', adapted to be operated from the ends of the box R'. The box is adapted to hold enough filler-tobacco for a single bunch, and as this quantity varies with the character of cigar to be produced the partitions T' are provided, in order that by their adjustment the capacity of the box between them may be increased or diminished at will.

Upon the rear end of the bottom S' of the box R' is provided the upwardly and rearwardly extending plate W', carrying upon its end the weight X', which operates to keep the door S' closed, except when said weight is elevated by contact with the cam-plate $y$. When the hinged section Z is turned upward upon the rod Y, the plate $y$, being rigid with the chute $i$, will turn downward and be relieved from contact with the weight X', which, being heavier than the door S', will move downward and thereby cause the door to close against the box R'. The relation of the chute $i$ and the box R' is such that when the door S' is open its lower end will rest against the front surface of said chute, as illustrated in Fig. 1.

Within the hopper G' are provided the horizontal shafts $a''$ and $b''$, provided with agitator-pins $c''$, (indicated by dotted lines in Fig. 1,) which operate during the use of the machine to prevent the loose tobacco from packing in the lower end of the hopper. Upon the right-hand end of the shaft $a''$ is applied the gear-wheel $d''$, and also the upper end of the rod $e''$, which carries the pawl $f''$ in contact with the teeth of the said wheel $d''$, and is connected at its lower end with the rear end of the draw-rod $g''$, the front end of the latter being collared upon the horizontal rod R. Upon the right-hand standard F' is secured upon a short shaft the intermediate pinion-wheel, $h''$, which gears with the wheel $d''$ and with the pinion $i''$, secured upon the end of the shaft $b''$, the purpose of the wheel $h''$ being to communicate the motion of the wheel $d''$ to the pinion $i''$ and the shaft $b''$. The motion of the rod R during the operation of rolling the bunches actuates, through the rods $g''$ and $e''$, the pawl $f''$, to impart an intermittent rotary movement to the wheel $d''$, and through it to the shafts $a''$ and $b''$, whereby said shafts are caused to feed the tobacco downward to the aperture K'.

The position of the section Z and roller P being that illustrated in the drawings, the aperture K' will be closed and the door S' open, as shown, and the operation of forming the bunches may be proceeded with by first moving the shaft R toward the rear of the machine, for the purpose of elevating the hinged section Z, closing the door S' upon the under surface of the charge-box R', and drawing the valve-plate M' from the aperture K', through which at this time a sufficient quantity of the tobacco will fall between the partitions T' for a single bunch. Upon the return of the rod R and roller P to their position illustrated in the drawings, a "binder" (lettered $m^4$ in Fig. 3) will be placed upon the apron C, its front edge resting over the rear side of the mold E, and the hinged section Z will return to its position upon the table B and the valve-plate M' close over the aperture K', the lower end of the funnel $l$ entering the mold E, and cam-plate $y$ elevating the weight X' and opening the door S', thereby permitting the tobacco which was in the box R' to fall upon the chute $i$, down which it will slide into the funnel $l$ and rest upon that portion of the apron C and binder over the mold E. The tobacco thus loosely filling the funnel will thereupon be pressed into the mold with the apron and edge of the binder, as shown in Fig. 3, by means of the plunger $q$, the cross-bar $t$ serving as a handle, the tobacco during this process being compacted and given substantially the form of the cigar to be produced. During the operation of pressing the tobacco into the mold in the table the plunger should be given two, three, or more rapid successive movements downward against the tobacco and then released, these movements serving to gradually compress the tobacco in the mold below the funnel preparatory to its being rolled to form a bunch. It will be observed that the plunger is to be operated by hand, and may be moved downward as many times as desired without disturbing the other parts of the machine, the operator being thus enabled to regulate at will the pressure to be applied to the tobacco and to produce a more perfect bunch under the varying conditions of tobacco than it would be possible to make were the plunger thrust downward by a positive connection with the moving parts of the machine. The hinged section Z will now be raised by the foot-treadle, as before, thus freeing its cam-arms $d$ from contact with the rollers K on the plate J and permitting the springs O to move said plate over the front edge of the mold E, whereby the apron C is folded over the tobacco, whereupon the rod R and roller P will be moved rearward, rolling the bunch and causing it to fall over the rear end of the table B, when it will be picked up by the attendant and placed in the wooden mold-board, hereinafter referred to.

The second elevation of the hinged section Z, just above mentioned, causes another charge of tobacco to enter the box R', which charge, after the rod R has been returned to the front of the machine, another binder placed on the apron C, and the hinged section Z lowered, will fall down the chute $i$ into the funnel $l$ and be pressed into the mold and then rolled to form a finished bunch, as in the previous instance, this operation being repeated as rapidly and frequently as may be desired. At each upward movement of the hinged section Z the box R' receives a charge of tobacco and a finished bunch rolls from the rear end of the table B, and at each downward movement of said section the charge falls from the box and, sliding down the chute $i$, enters the funnel $l$ and rests upon the apron C and edge of the binder over the mold E, preparatory to being acted on by the plunger. At each downward movement of the section Z the advance cam-arms $d$, acting upon the roller K, move the plate J from over the mold E, so as to allow the lower edges of the funnel $l$ to enter the same.

It is advantageous in the manufacture of the cigars to give the bunch while being formed and rolled an outline corresponding in size and shape to the cigar to be produced; and with this end in view the surfaces of the sides of the funnel, the bottom of the plunger therefor, and the edge of the plate J have been given the form of a finished cigar. This formation also aids in the uniform distribution of the filler-tobacco.

In the manufacture of a very cheap cigar it may not be necessary to observe the details of form in the funnel, plunger, and plate above referred to; but when said directions are followed important advantages in the character of the result will ensue. If it should be preferred, under any circumstances, to feed the filler-tobacco by hand, the hopper, and possibly the chute and funnel, could be omitted and only a part of the invention used. I recommend, however, that the funnel be employed in connection with some suitable mechanism for elevating it from the table at the proper time.

Upon the left-hand edge of the table is provided the triangular-shaped box $j''$, and also the standard $k''$, in the upper end of which is dropped the reduced end $l''$ of the horizontal arm $m''$. (See Figs. 2 and 10.) The purpose of the box $j''$ and arm $m''$ is to support the ordinary wooden mold-board, (shown by dotted lines in Fig. 10,) for the purpose of enabling the attendant to introduce the bunches into the same as they are formed. After one of the wooden mold-boards has been filled with bunches it will be removed and another substituted in its place. The box $j''$ is secured upon a pivot, $n''$, which permits it to be turned over the edge of the machine when desired, and the standard $k''$ is pivotally secured at its lower end, in order that it may be folded downward upon the bed-plate A when desired, the object of thus securing the box $j''$ and standard $k''$ being to permit the said parts to be folded out of the way when it is desired to pack the machine for shipment. The horizontal bar $m''$ may be removed from its standard $k''$ by simply lifting it therefrom.

Upon the under side of the bed-plate A may be arranged a sliding drawer, as shown in Fig. 2, if desired, to hold the binders necessary for the bunches to be rolled.

What I claim as my invention, and desire to secure by Letters Patent, is—

1. In a cigar-bunching machine, the rolling-table having the mold, the apron resting on said table, and the reciprocating roller, combined with the hinged section, the funnel, plunger, and chute carried by said section, an elevated hopper, and suitable mechanism for elevating the said section, substantially as set forth.

2. In a cigar-bunching machine, the table, the apron resting on said table, the reciprocating roller, and the mold in said table, combined with the hinged section carrying the funnel and plunger, the latter being connected with vertical rods and having a spring-tension upward, and suitable mechanism for raising the hinged section, substantially as set forth.

3. In a cigar-bunching machine, the table having the mold, the apron resting on said table, and the reciprocating roller, combined with the hinged section, the funnel on the front end of said section and adapted when depressed to enter said mold, the counter-balance on the rear end of same, a plunger for the funnel, and suitable mechanism for raising said hinged section, substantially as set forth.

4. In a cigar-bunching machine, the table, apron, and reciprocating roller, combined with the mold in said table, the sliding plate between said mold and end of the table and having a tension toward said mold, the hinged section whose front portion, when depressed, comes into contact with said plate, the funnel on the front end of said section, a plunger for the funnel, and suitable mechanism for raising said section, substantially as set forth.

5. In a cigar-bunching machine, the table, apron, mold, and reciprocating roller, combined with the sliding plate J, having rollers K and springs O, the hinged section having cam-arms d, the funnel on the front end of said section, the plunger for said funnel, and suitable mechanism for raising the section, substantially as set forth.

6. In a cigar-bunching machine, the mold-supporting device consisting of the hinged standard $k''$, horizontal detachable arm $m''$, and pivoted box $j''$, substantially as set forth.

7. In a cigar-bunching machine, the table having the mold, the apron, and the reciprocating roller, combined with an elevated hopper, the funnel and plunger, a chute leading from said hopper to said funnel, the hinged section, and suitable mechanism for raising the hinged section, the lower end of the chute having wings at opposite sides capable of lateral adjustment, substantially as set forth.

Signed at New York, in the county of New York and State of New York, this 3d day of May, A. D. 1887.

JOHN R. WILLIAMS.

Witnesses:
CHAS. C. GILL,
W. A. C. MATTHIE.